(12) United States Patent
Hirota

(10) Patent No.: US 7,654,437 B2
(45) Date of Patent: Feb. 2, 2010

(54) METHOD FOR BONDING METALLIC PLATES AND JIG FOR THE BONDING OF THE METALLIC PLATES

(75) Inventor: Atsushi Hirota, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 445 days.

(21) Appl. No.: 11/325,334

(22) Filed: Jan. 5, 2006

(65) Prior Publication Data

US 2006/0180638 A1 Aug. 17, 2006

(30) Foreign Application Priority Data

Jan. 6, 2005 (JP) ............... 2005-001046

(51) Int. Cl.
*B23K 31/02* (2006.01)
(52) U.S. Cl. .................................... 228/190
(58) Field of Classification Search .............. 228/190
See application file for complete search history.

(56) References Cited

U.S. PATENT DOCUMENTS

| 4,953,287 | A | * | 9/1990 | West et al. ............. 29/611 |
| 5,118,026 | A | | 6/1992 | Stacher |
| 7,237,876 | B2 | | 7/2007 | Hirota |
| 2001/0020965 | A1 | * | 9/2001 | Fujii et al. ............. 347/54 |
| 2002/0051042 | A1 | * | 5/2002 | Takagi et al. ........... 347/72 |
| 2004/0157519 | A1 | * | 8/2004 | Goodell et al. .......... 442/181 |
| 2004/0183867 | A1 | | 9/2004 | Hirota |

FOREIGN PATENT DOCUMENTS

| JP | 5 16373 | 1/1993 |
| JP | H06-226467 A | 8/1994 |
| JP | 9 150503 | 6/1997 |
| JP | 2004 276562 | 10/2004 |
| JP | 2004-276562 A | 10/2004 |

OTHER PUBLICATIONS

Japanese Office Action issued in corresponding Japanese Application No. 2005-001046, dated Oct. 14, 2008.

* cited by examiner

*Primary Examiner*—Jessica L. Ward
*Assistant Examiner*—Nicholas P D'Aniello
(74) *Attorney, Agent, or Firm*—Baker Botts L.L.P.

(57) ABSTRACT

A method for bonding metallic plates includes: sandwiching a laminated body, which includes a plurality of metallic plates and is formed with an inner cavity opening on a surface thereof, between a pair of jigs each having a flat abutment surface abutting against respective surfaces of the laminated body, wherein at least one of the jigs is formed with an atmosphere communication path, which communicates with the inner cavity and atmosphere; and heating the laminated body while applying pressure to the laminated body with the pair of jigs in a lamination direction of the laminated body.

9 Claims, 10 Drawing Sheets

METHOD FOR BONDING METALLIC PLATES AND JIG FOR THE BONDING OF THE METALLIC PLATES

This application is based upon and claims the benefit of priority from Japanese Patent Application No. 2005-1046 filed on Jan. 6, 2005; the entire contents of which are incorporated herein by reference.

BACKGROUND OF THE INVENTION

1. Field of the Invention

The invention relates to a method for bonding a plurality of laminated metallic plates and a jig for the bonding of the metallic plates.

2. Description of the Related Art

Hitherto, there has been known as an inkjet head that ejects ink from nozzles, one in which a flow-path unit including an ink flow path therein is formed of a plurality of metallic plates laminated on each other. For example, US 2004/0183867 A discloses an inkjet head includes a manifold and a flow-path unit having individual ink flow paths extending from the manifold to the nozzles via pressure chambers. This flow-path unit is formed of a laminated body in which a plurality of metallic plates are laminated and bonded to each other. In this case, as a method for bonding the plurality of metallic plates, bonding with adhesive or diffusion bonding may be used.

In the case where a plurality of metallic plates are bonded to each other by means of the diffusion bonding, the plurality of metallic plates are sandwiched with flat-shaped jigs from both sides thereof and are applied to pressure while being heated at a high temperature (about 1000° C.) in vacuo. Thereby, metallic atoms are mutually diffused in bonding surfaces of the metallic plates and finally, the metallic plates are bonded to each other. When the bonding is conducted by means of the diffusion bonding described above, the plurality of metallic plates can be bonded to each other all at once. Therefore, the bonding step can be simplified.

SUMMARY OF THE INVENTION

However, when a laminated body including a plurality of metallic plates is sandwiched between jigs, since an ink flow path to be formed is tightly closed, air may remain in the ink flow path. If this laminated body is heated, since air remaining in the ink flow path is expanded to increase the inner pressure. As a result, failure of adhesion may be caused in a portion where a sufficiently large adhesion region is not provided to thereby cause ink to leak out from the ink flow path or a temperature distribution may become non-uniform to thereby cause distortion and deflection in the ink flow path.

The invention bonds a plurality of metallic plates to each other without causing failure of bonding or generating distortion.

According to one aspect of the invention, a method for bonding metallic plates includes: sandwiching a laminated body, which includes a plurality of metallic plates and is formed with an inner cavity opening on a surface thereof, between a pair of jigs each having a flat abutment surface abutting against respective surfaces of the laminated body, wherein at least one of the jigs is formed with an atmosphere communication path, which communicates with the inner cavity and atmosphere; and heating the laminated body while applying pressure to the laminated body with the pair of jigs in a lamination direction of the laminated body.

According to this method, when the pair of jigs sandwich the laminated body of the metallic plates therebetween, the inner cavity of the laminated body communicates with the atmosphere via the atmosphere communication path formed in the at least one of the jigs. Therefore, it is possible to surely release the air from the inner cavity to the outside via the atmosphere communication path before the diffusion bonding is conducted. Accordingly, when the laminated body is heated, the air in the inner cavity is not expanded. As a result, it can be possible to prevent failure of bonding the metallic plates from occurring and non-uniform temperature distribution, which causes distortion of the metallic plate, from occurring. Since the atmosphere communication path is provided in the at least one of the jigs, it is unnecessary to provide a step of providing an atmosphere communication path, which communicates the inner cavity with the atmosphere, on the laminated body side in advance. Accordingly, the manufacturing process can be simplified.

According to another aspect of the invention, each of a pair of jigs for bonding of a plurality of metallic plates includes a flat abutment surface capable of abutting against a counterpart side of a laminated body, which includes the plurality of metallic plates and is formed with an inner cavity opening on a surface thereof. At least one of the pair of jigs includes an atmosphere communication path communicating with atmosphere. The atmosphere communication path is capable of communicating with the inner cavity. According to this structure, when the pair of jigs sandwich the laminated body of the metallic plates therebetween, the inner cavity of the laminated body communicates with the atmosphere via the atmosphere communication path formed in the at least one of the jig. Therefore, the air can be surely discharged from the inner cavity to the outside via the atmosphere communication path before conducting the diffusion bonding. As a result, it is possible to prevent failure of the bonding between bonding surfaces of the metallic plates due to expansion of the air in the inner cavity when heated and distortion from being generated due to a non-uniform temperature distribution.

DETAILED DESCRIPTION OF EMBODIMENTS OF THE INVENTION

Referring to the accompanying drawings, embodiments of the invention will be explained below.

This embodiment is an example in which the invention is applied to an inkjet head of an inkjet printer.

Figure 1:
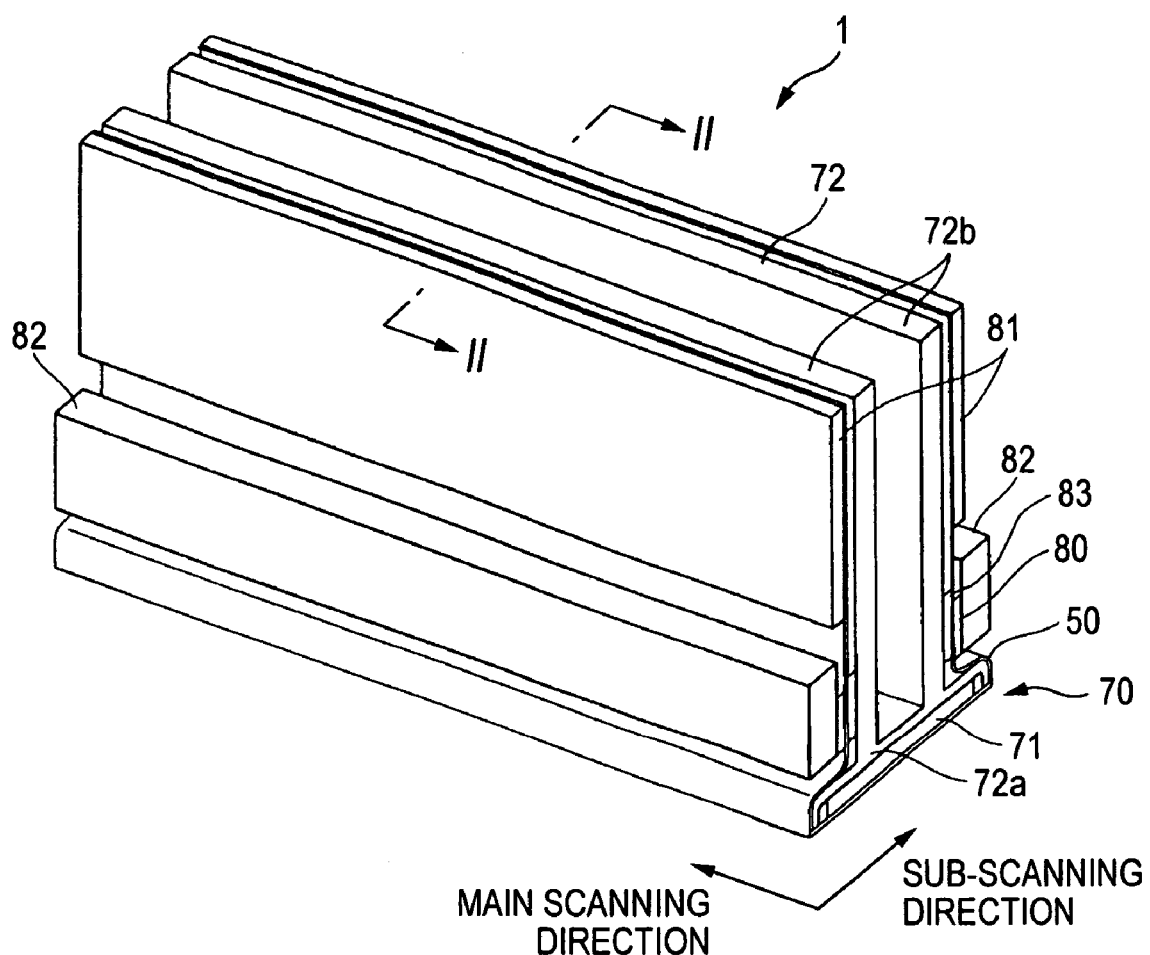
FIG. 1 is a perspective view showing appearance of an inkjet head of one embodiment.

First of all, referring to FIG. 1, the entire structure of the inkjet head of this embodiment of the invention is explained as follows. FIG. 1 is a perspective view showing appearance of the inkjet head of this embodiment.

The inkjet head 1 includes a head unit 70 and a base block 71. The head unit 70 has a rectangular shape in plan view and extends in a main scanning direction in terms of ejecting ink to a sheet of paper. The base block 71 is formed with a flow path of ink to be supplied to the head unit 70. A holder supports the base block 71. This holder 72 includes a holding portion 72a and a pair of flat-plate members 72b. The holding portion 72a accommodates the base block 71. The pair of flat-plate members 72b extend from the upper surface of the holding portion 72a in a direction perpendicular to the plane of the base block 71 with spaced at a predetermined interval.

Two sheets of FPC 50 are drawn out from the head unit 70. These sheets of FPC 50 are arranged along surfaces of the flat-plate members 72b of the holder 72 via elastic members 83. On each sheet of FPC 50, a driver IC 80 is arranged at a position opposing to the elastic member 83. In the sheet of FPC 50, a conductor pattern functioning as a feeder wire is provided to transmit a drive signal output from the driver IC 80 to an actuator unit 21 (see FIG. 2) of the head unit 70.

Furthermore, on the outer surface of each driver IC 80, a heat sink 82 is arranged to be in close contact with the outer surface of each driver IC 80, so that heat generated from the driver ICs 80 can be irradiated to the heat sinks 82. Also, substrates 81 are arrange above the driver ICs 80 and the heat sinks 82. The driver ICs 80 and the substrates 81 are electrically connected to each other through the sheets of FPC 50.

Figure 2:
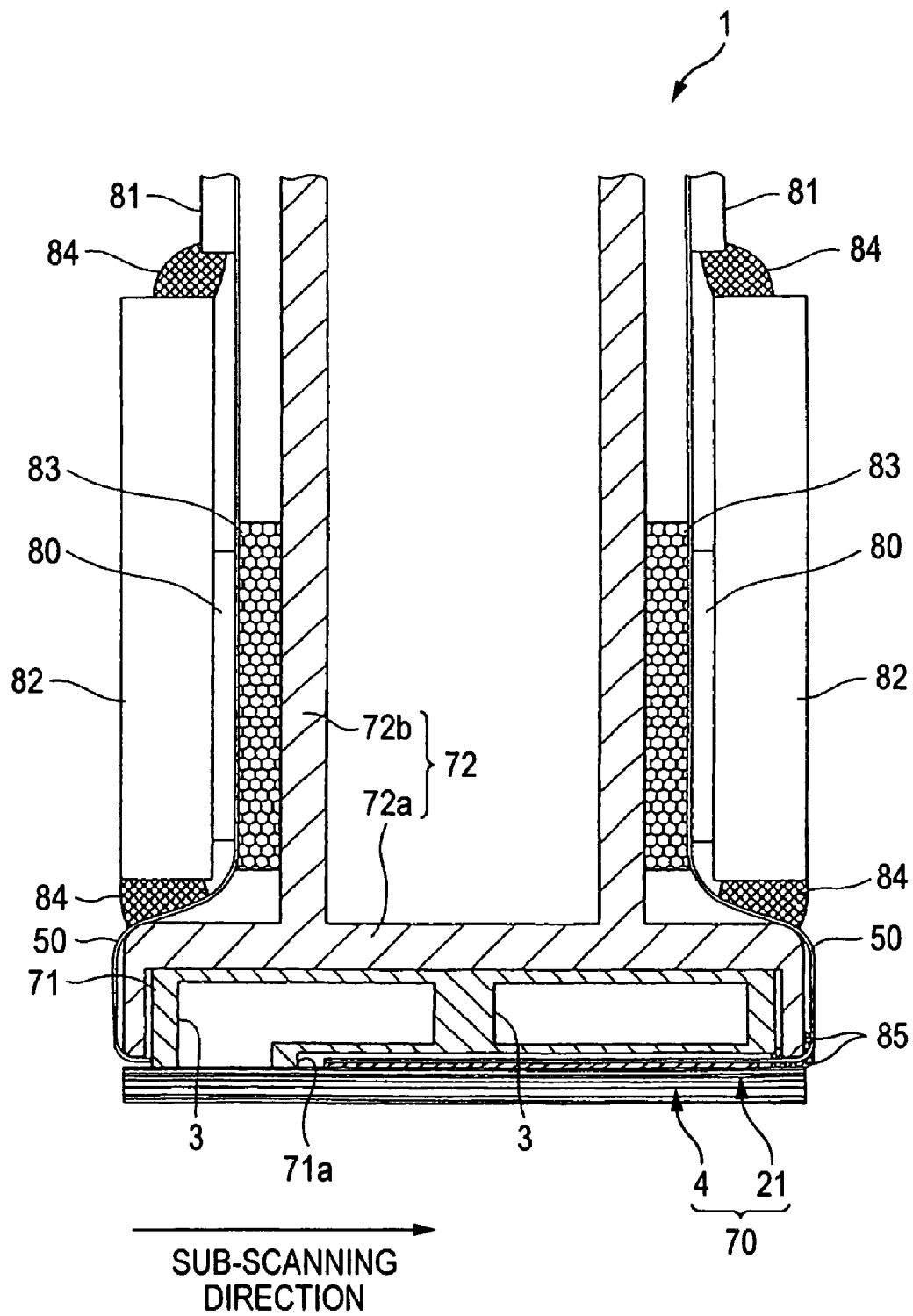
FIG. 2 is a section view taken along line II-II in FIG. 1.

Next, referring to FIG. 2, the structure of the head unit 70 and the base block 71 shown in FIG. 1 will be described in detail. FIG. 2 is a section view taken along line II-II in FIG. 1.

The head unit 70 includes a flow-path unit 4 and the actuator unit 21. The flow-path unit 4 is formed with an ink flow path. The actuator unit 21 is bonded to the upper surface of the flow-path unit 4 by adhesive. Each of the flow-path unit 4 and the actuator unit 21 are configured so that a plurality of thin plates are laminated and bonded to each other. Also, the sheets of FPC 50 are bonded to the upper surface of the actuator unit 21.

The base block 71 is fixed to a portion on the upper surface of the flow-path unit 4 where the actuator unit 21 is not bonded. However, the base block 71 faces the actuator unit 21 with a predetermined gap therebetween. That is, as shown in FIG. 2, recess portion 71a is formed on the outside of the lower surface of the base block 71, so as to correspond to a position where the actuator unit 21 is arranged on the flow-path unit 4. The actuator unit 21 is arranged just in this recess portion 71a together with the sheets of FPC 50. The sheets of FPC 50 are drawn out while leaving some allowance with respect to the base block 71.

The base block 71 is made of metallic material such as stainless steel and fixed to the inside of the holding portion 72a of the holder 72 by means of adhesion. In the base block 71, two ink reservoirs 3, which have a hollow portion and are a rectangular parallelepiped, are provided. These two ink reservoirs 3 will be described in detail later.

Each heat sink 82, which is arranged on a surface of each flat plate portion 72b, is fixed to each substrate 81 and each sheet of FPC 50 via seal members 84. Each sheet of FPC 50 is fixed to the forward end of each holding portion 72a of the holder 72 and the upper surface of the flow-path unit 4 via seal members 85.

Next, referring to FIGS. 3 to 7, the head unit 70 will be described below.

Figure 3:
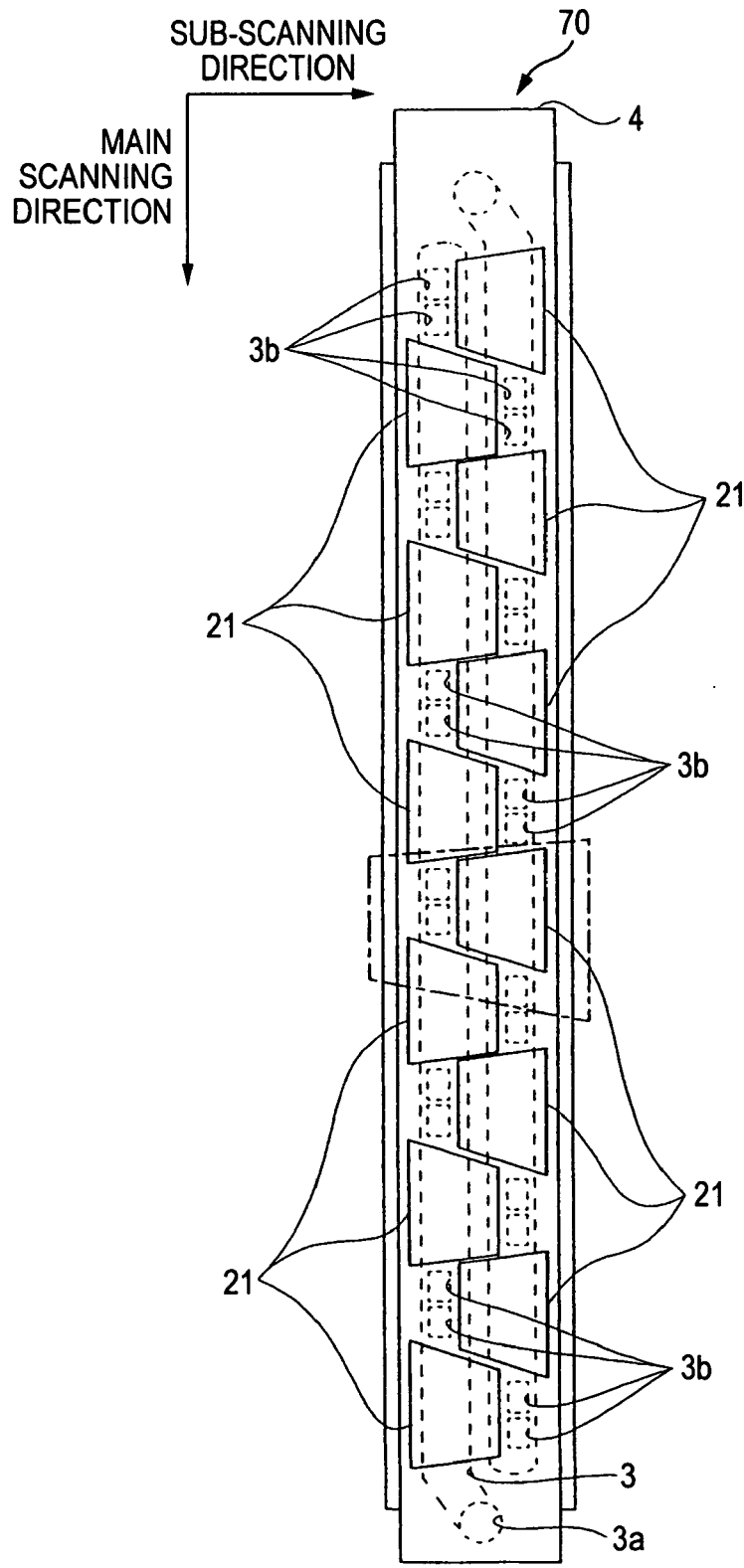
FIG. 3 is an enlarged plan view of a head unit shown in FIG. 2.

FIG. 3 is a plan view of the head unit 70 shown in FIG. 2. For the sake of convenience for describing the ink supply mode, flow paths (the ink reservoirs 3, openings 3a and openings 3b) formed in the base block 71 are shown by dotted lines. As shown in FIG. 3, the two ink reservoirs 3 extend in the longitudinal direction of the head unit 70 in parallel with each other, with separated a predetermined interval. Each ink reservoir 3 has an opening 3a at one end. Each ink reservoir 3 communicates with an ink tank (not shown) via this opening 3a and always filled with ink. Also, in each ink reservoir 3, pairs of openings 3b are provided. The pairs of openings 3b provided in the two ink reservoirs 3 are arranged in the extending direction of the ink reservoirs 3 at predetermined intervals so that the openings 3b don't overlap each other in the width direction of the head unit 70.

The actuator units 21 each having a trapezoidal shape in plan view are arranged between the pairs of openings 3b. In more detail, each actuator unit 21 has in plan view the trapezoidal shape having parallel opposing sides (an upper side and a lower side) along the longitudinal direction of the head unit 70. The actuator units 21 are arranged in a zigzag manner, and adjacent oblique sides thereof overlap each other in the width direction of the head unit 70.

Figure 4:
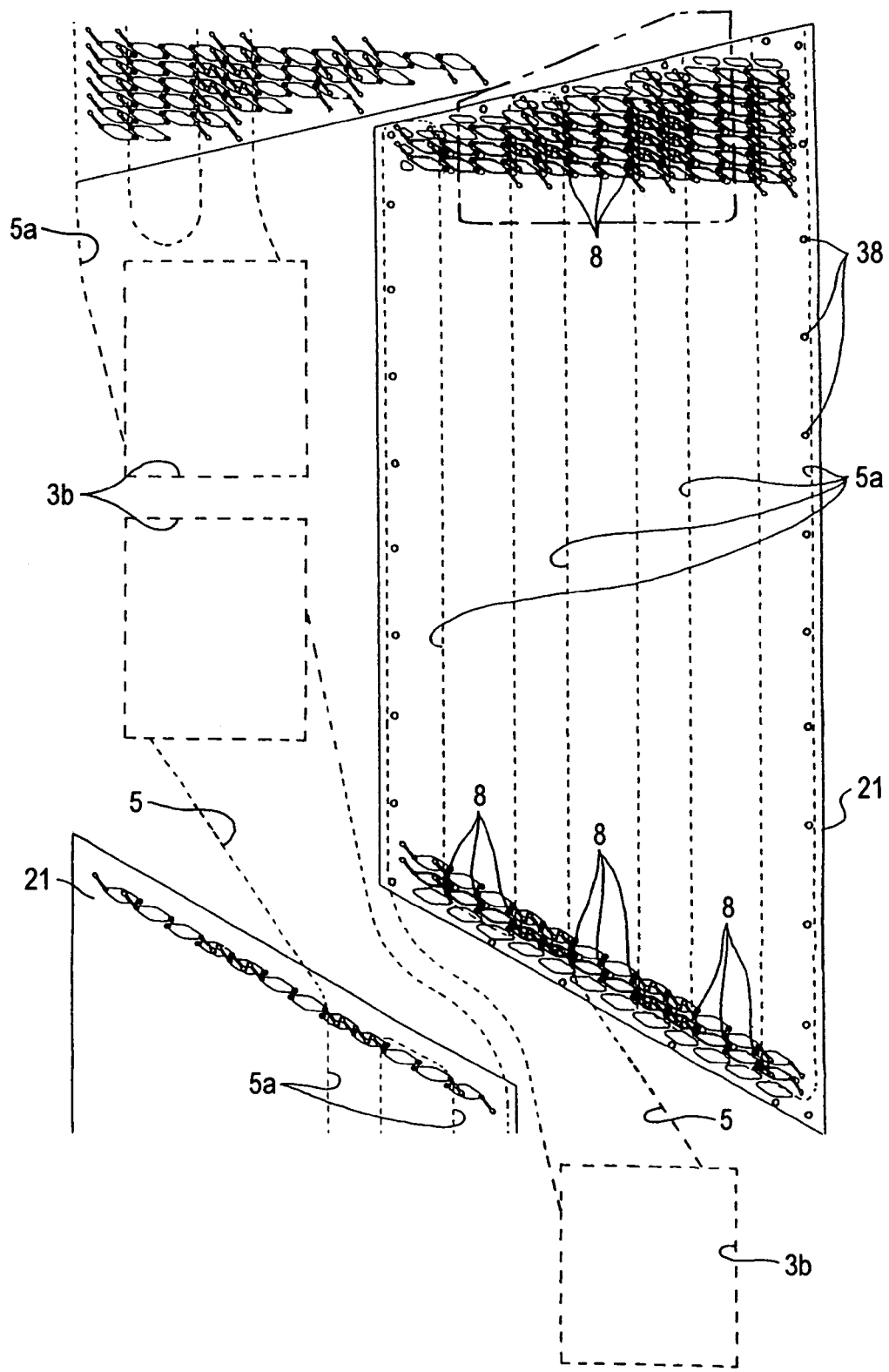
FIG. 4 is an enlarged plan view showing a region surrounded by dashed lines in FIG. 3.

FIG. 4 is an enlarged view showing a region surrounded by dashed lines in FIG. 3. In this case, flow paths formed in the flow-path unit 4 are not shown by the dotted lines. As shown in FIG. 4, the openings 3b provided in each ink reservoir 3 communicate with manifolds 5 (serving as a common ink chamber). Furthermore, the forward end portion of each manifold 5 branches into two to form sub-manifolds 5a. In the plan view, two pairs of the sub-manifolds 5a, which are branched from the adjacent openings 3b, extend from the two oblique sides of the actuator unit 21. That is, the four sub-manifolds 5a extend in total along the parallel opposing sides of the actuator unit 21.

On the lower surface of the flow-path unit 4 (shown in FIG. 6), the ink ejection nozzles 8 are arranged in matrix in a region opposite to the actuator units 21 so as to form an ink ejection region. Also, although the ejection nozzles 8 are partially shown in FIG. 4, the ejection nozzles 8 are arranged all over the inkjet region on the lower face of the flow-path unit 4.

Figure 5:
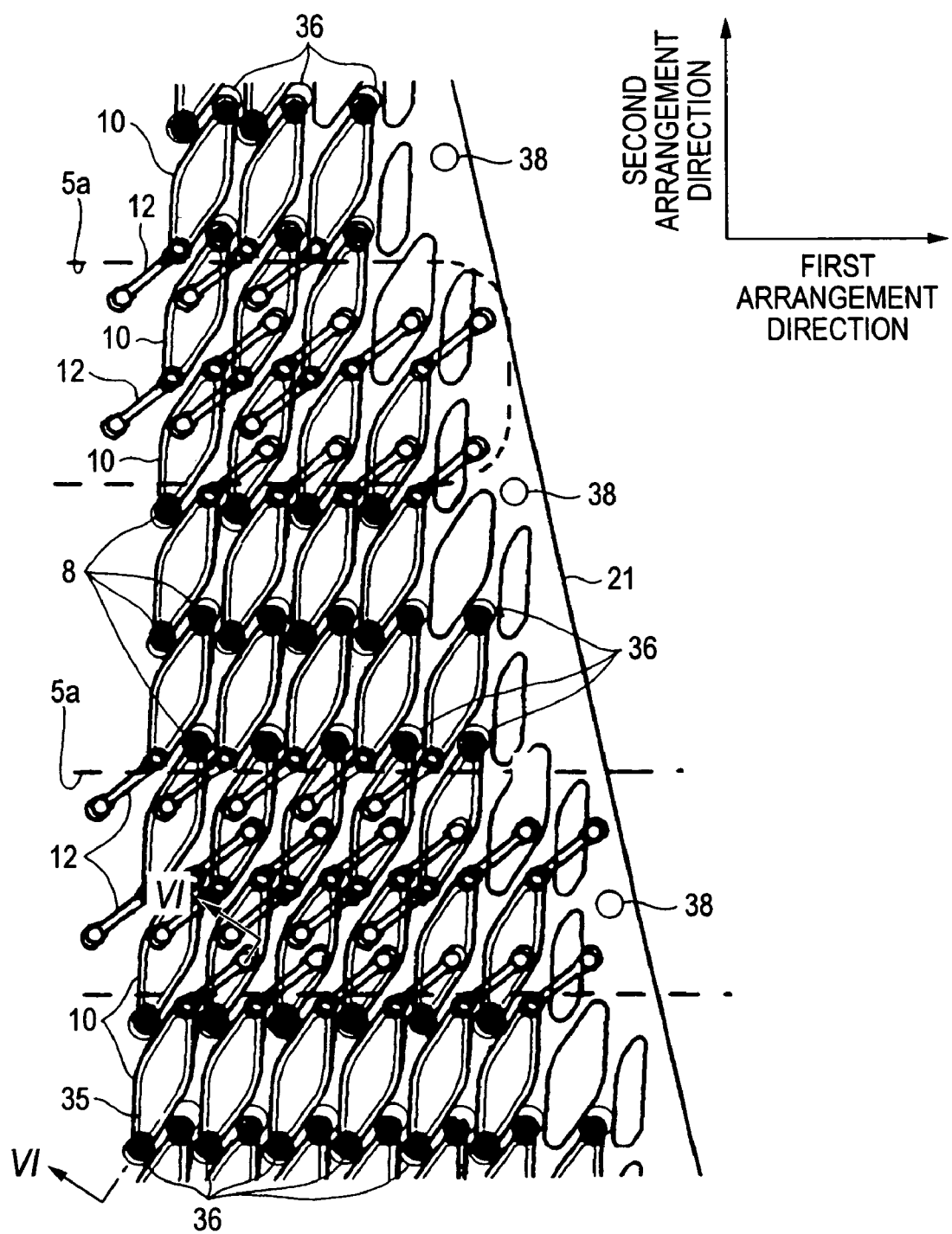
FIG. 5 is an enlarged plan view showing a region surrounded by dashed lines in FIG. 4.

FIG. 5 is an enlarged view showing a region surrounded by one-dotted chain lines in FIG. 4. In this drawing, the neighborhood of the end portion of the actuator unit 21 is shown with enlarged. However, for the sake of facilitating to understand the drawing, an individual ink flow path extending from an aperture 12 to the nozzle 8 via a pressure chamber 10, which is hidden by the actuator unit 21 and cannot be seen, is drawn by the solid lines. The sub-manifold 5a formed in the flow-path unit 4 is shown by the dotted lines. As shown in FIG. 5, a large number of individual electrodes 35 (described later) are arranged on the surface of the actuator unit 21. The pressure chambers 10 and the individual electrodes 35 are arranged to overlap each other, and to be adjacent to each other along the surface of the flow-path unit 4.

As shown in FIG. 5, the pressure chambers 10 and the sub-manifolds 5a communicate with each other via the aperture 12. As shown in FIG. 5, one end of the aperture 12 is located in a region of the sub-manifold 5a, and the other end of the aperture 12 is located in the region of the acute angle portion of the pressure chamber 10 having a substantially rhombic shape.

As can be seen in FIG. 5, two apertures 12 overlap one pressure chamber 10. This arrangement can be realized by providing the pressure chamber 10 and the aperture 12 in the flow-path unit 4 at different heights. According to this arrangement, it becomes possible to arrange the pressure chambers 10 highly densely. Furthermore, it becomes possible to realize forming an image of high resolution by the inkjet head 1, whose the occupying area is relatively small.

In this embodiment, the pressure chambers 10 are formed into a matrix shape in two directions, that is, the longitudinal direction (serving as a first arrangement direction) of the head unit 70 and a direction (serving as a second arrangement direction), which is somewhat inclined from the width direction.

As shown-in-FIG. 5, each ink ejection nozzle 8 is arranged in a portion substantially corresponding to one acute angle in each rhombic-shaped pressure chamber 10 outside the region of the sub-manifold 5a. In this embodiment, the ejection nozzles 8 are arranged in the first arrangement direction at intervals of 50 dpi, and the pressure chambers 10 are arranged so that 12 pressure chambers are contained in the regions corresponding to the actuator units 21 in terms of the second arrangement direction at maximum. A length in the first arrangement direction occupied by the 12 pressure chambers 10, which are arranged in the second arrangement direction, corresponds to a length (pitch) occupied by two pressure chambers 10, which are adjacent to each other in the first arrangement direction. That is, 12 ejection nozzles 8 are arranged in the width direction of the inkjet head 1 in a range between the ejection nozzles 8 arranged in the acute angle portion of the two pressure chambers 10, which are adjacent to each other in the first arrangement direction. In this connection, the oblique side (shown in FIG. 3) of the actuator unit 21 establishes complementary relation with the oblique side portion of the actuator unit 21 facing thereto in the width direction of the inkjet head 1. Thus, the oblique side of each actuator unit 21 meets the above condition.

Consequently, according to the inkjet head 1 of this embodiment, when ink drops are successively ejected from a large number of ejection nozzles 8, which are arranged in the matrix shape, in accordance with a relative movement of a sheet of paper in a sub-scanning direction (shown in FIG. 3) with respect to the inkjet head 1, printing can be conducted in the main scanning direction at the resolution of 600 dpi.

As described above, in the inkjet head 1 of the this embodiment, an ink flow path 32 (shown in FIG. 6) is formed from the ink tank (not shown) to the tapered ejection nozzle 8, which is formed at the forward end portion of the flow-path unit 4, via the manifold 5, the sub-manifold 5a, the aperture 12 and the pressure chamber 10.

Figure 6:
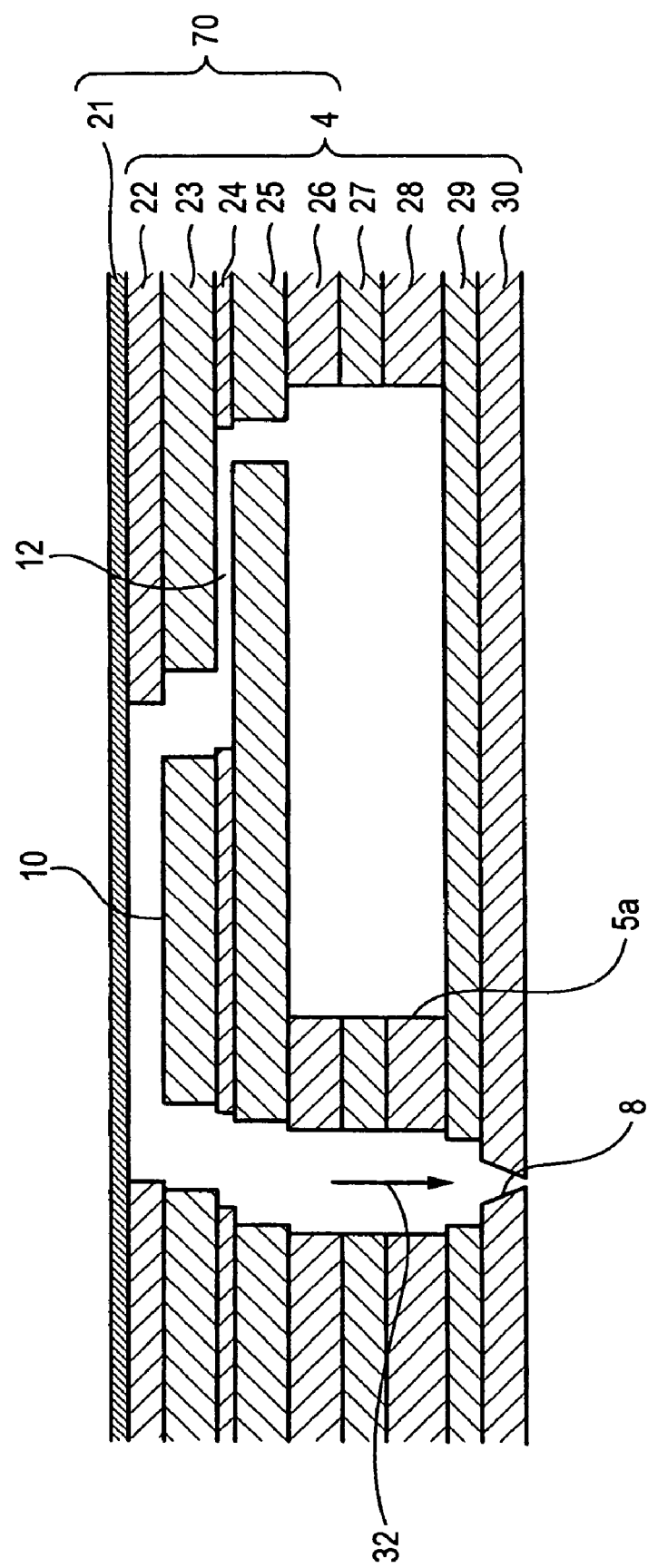
FIG. 6 is a section view taken along line VI-VI in FIG. 5.

Next, referring to FIG. 6, the sectional structure of the head unit 70 will be described in detail below. FIG. 6 is a section view of the head unit 70 taken along line VI-VI in FIG. 5.

As shown in FIG. 6, the flow-path unit 4 includes 9 metallic plates, which are laminated on each other, including a cavity plate 22, a base plate 23, an aperture plate 24, a supply plate 25, manifold plates 26, 27, 28, a cover plate 29 and a nozzle plate 30. These metallic plates are made of, for example, metal such as stainless steel.

The cavity plate 22, which is the uppermost layer formed in the flow-path unit 4, is a metallic plate in which a large number of rhombic-shaped openings corresponding to the pressure chambers 10 are provided. The base plate 23 is a metallic plate having a communication holes for communicating the pressure chambers 10 formed in the cavity plate 22 with the apertures 12 formed in the lower layer plate and also having communication holes for communicating the pressure chambers 10 with the ejection nozzles 8. The aperture plate 24 is a metallic plate having the apertures 12 and communication holes for communicates with the communication hole formed on the base plate 23 with the ejection nozzles 8. The supply plate 25 is a metallic plate having communication holes for communicating the apertures 12 with the sub-manifolds 5a formed in the lower layer plate and also having communication holes for communicating with the communication holes formed in the aperture plate 24 with the ejection nozzles 8. The manifold plate 28 is a metallic plate having the sub-manifolds 5a and communication holes for communicating the communication holes formed in the supply plate 25 with the ejection nozzle 8. The cover plate 29 is a metallic plate having communication holes, which are smaller than the communication holes of the manifold plates 26, 27, 28, connected to the ejection nozzle 8. The nozzle plate 30 is a metallic plate in which the large number-of-ink ejection nozzles 8 are provided. An ink ejection region corresponds to a region where the ejection nozzles 8 corresponding to the actuator unit 21 are distributed.

These nine metallic plates 22 to 30 are positioned and laminated on each other so that the ink flow paths 32 shown in FIG. 6 are formed, to thereby form the flow-path unit 4. The ink flow path 32 extends upward from the sub-manifold 5a and then extends horizontally. Then, the ink flow path 32 extends upward and then extends horizontally in the pressure chamber 10. Then, the ink flow path 32 extends obliquely downward so as to be apart from the aperture 12. After that, the ink flow path 32 extends vertically downward toward the ejection nozzle 8.

Figure 7:
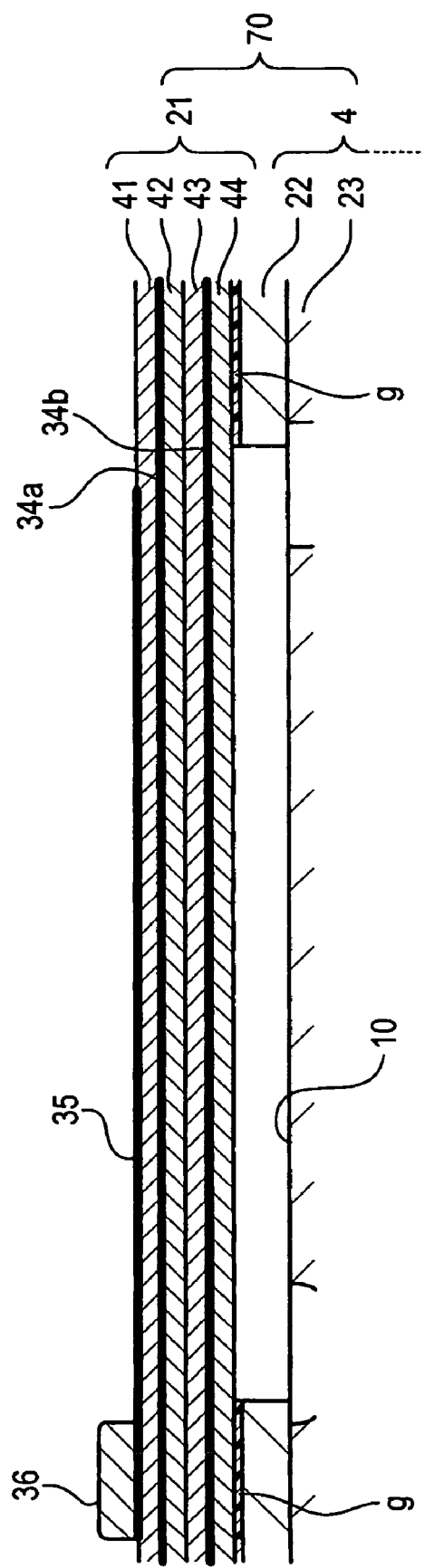
FIG. 7 is an enlarged section view of an actuator unit shown in FIG. 6.

Next, referring to FIG. 7, explanations will be made on the structure of the actuator unit 21 laminated on the cavity plate 22 of the flow-path unit 4. FIG. 7 is an enlarged section view of the actuator unit 21 shown in FIG. 6.

As shown in FIG. 7, the actuator unit 21 includes piezoelectric sheets 41, 42, 43, 44, which are four continuous-flat-plate layers. These piezoelectric sheets 41, 42, 43, 44 are made of lead zirconate titanate (PZT) based ceramics having a good workability and a ferroelectric property. These piezoelectric sheets 41, 42, 43, 44 form piezoelectric elements and are arranged over a large number of pressure chambers 10, which are formed corresponding to one ink ejection region. According to the above structure, the mechanical rigidity of the piezoelectric elements can be maintained high and response of the ink ejection property of the inkjet head 1 can be enhanced.

On the piezoelectric sheet 41 of the uppermost layer, the individual electrodes 35 are formed to be opposed to the pressure chambers 10. As shown in FIG. 7, common electrodes 34a, 34b, which are formed all over the sheet, are interposed between the piezoelectric sheet 41 of the uppermost layer and the piezoelectric sheet 42 on its lower layer and between the piezoelectric sheet 43 and the piezoelectric sheet 44 on its lower layer, respectively. No electrodes are arranged between the piezoelectric sheet 42 and the piezoelectric sheet 43. These individual electrodes 35 and the common electrodes 34a, 34b are made of metal such as metal of Ag—Pd. As described later in detail, the individual electrodes 35 and the common electrodes 34a, 34b are used to apply an electric field to and deform the piezoelectric sheets 41 to 44, to thereby change the volume of each pressure chambers 10.

As shown in FIG. 5, each electrode 35 is formed into a rhombic shape in plan view, which is substantially similar to the pressure chamber 10. One of the acute angle portions of the substantially rhombic-shaped individual electrode 35 protrudes. A circular land portion 36, which is electrically connected to the individual electrode 35, is provided at the forward end of the acute angle portion. As shown in FIG. 7, the land portion 36 is formed on a surface of the protruding portion of the individual electrode 35. Material of the land portion 36 is, for example, gold containing glass frit. The land portions 36 are connected to the driver ICs 80 via the sheets of FPC 50. The driver ICs 80 give drive voltages to the individual electrodes 35.

As shown in FIG. 7, each land portion 36 is provided at a position corresponding to one end portion of each pressure chamber 10. A projection region of each individual electrode 35 is included in the region of each pressure chamber 10 in the direction of laminating the piezoelectric sheets 41 to 44. However, the projection region of each land portion 36 is not included in the region of each pressure chamber 10. That is, the land portions 36 are opposed to beam portions, which are formed in the cavity plate 22, define the pressure chambers 10 and isolate the pressure chamber 10 from the adjacent pressure chamber 10.

As shown in FIGS. 4 and 5, a large number of ground electrodes 38 are arranged in the neighborhood of the outer edge of the actuator unit 21 with being separated from each other. Although not shown in FIG. 7, these ground electrodes 38 are printed on a surface of the piezoelectric sheet 41 of the uppermost layer of the actuator unit 21. Each of the ground electrodes 38 is connected to the common electrode 34a via through-hole formed in the piezoelectric sheets 41. The common electrode 34a and other common electrode 34b are connected to each other via through-hole formed in the piezoelectric sheets 42, 43.

Although not shown in the drawing, not only conductor patterns 53 (described later), which are wiring connected to the driver ICs 80, but also conductor patterns, which are wiring having ground terminals connected to the ground electrodes 38 and are used for grounding, are provided on the sheet of FPC 50. When the ground terminals (not shown) on the sheets of FPC 50 and the ground electrodes 38 are bonded to each other, the common electrodes 34a, 34b connected to the ground electrodes 38 are maintained at the ground electric potential in all regions corresponding to the pressure chambers 10.

A method of driving the actuator units 21 in this embodiment will be described below.

The polarization direction of the piezoelectric sheets 41 to 44 in the actuator unit 21 is the thickness direction, which is a so-called unimolph type structure. First, when the driver IC 80 is controlled, the individual electrodes 35 are set at a positive or negative predetermined electric potential via the sheet of FPC 50. For example, if the direction of the electric field and the polarization direction are the same, the piezoelectric sheet 41, which is an active layer, shrinks in the direction perpendicular to the polarization direction, and the other piezoelectric sheets 42 to 44 are not affected by the electric field. Therefore, the other piezoelectric sheets 42 to 44 don't shrink spontaneously. In this case, a difference in distortion in the polarization direction is caused between the piezoelectric sheet 41 and the piezoelectric sheets 42 to 44, which are the lower layers. Therefore, a deformation (unimolph deformation), which is convex toward the non-active side, that is, toward the pressure chamber 10 side, is caused on the entire piezoelectric sheets 41 to 44. Then, a volume of each pressure chamber 10 is lowered and the ink pressure is raised. Therefore, ink is ejected from the ejection nozzle 8 shown in FIG. 5. After that, when applying the drive voltage to the individual electrodes 35 is stopped, the shapes of the piezoelectric sheets 41 to 44 are returned to the initial shapes, and the volume of each pressure chamber 10 is returned to the initial volume. Accordingly, ink is sucked from the manifold 5.

If the direction of the electric field and the polarization direction are opposite to each other, the piezoelectric sheet 41, which is an active layer, expands in the direction perpendicular to the polarization direction. Therefore, the piezoelectric sheets 41 to 44 are curved due to the transverse piezoelectric effect so as to be concave toward the pressure chamber side. Then, the volume of each pressure chamber 10 is increased and ink is sucked from the manifold 5. After that, when applying the drive voltage to the individual electrodes 35 is stopped, the piezoelectric sheets 41 to 44 are returned to the initial shapes and the volume of each pressure chamber 10 is returned to the initial volume. As a result, ink is ejected from the ejection nozzles 8.

Concerning another drive method, the following method may be provided. Voltage is previously applied to the individual electrodes 35. Whenever the ink ejection operation is required, applying voltage is once stopped. Then, voltage is applied again at a predetermined timing. In this case, when the piezoelectric sheets 41 to 44 are returned to the initial shapes at the timing of stopping applying voltage, the volume of the pressure chamber 10 is increased as compared with the volume of the pressure chamber 10 in the initial state (the state in which voltage is previously applied), and ink is sucked from the manifold 5. After that, at the timing when voltage is applied again, the piezoelectric sheets 41 to 44 are deformed so as to be convex toward the pressure chamber 10 side. Due to the reduction of the volume of the pressure chambers 10, the ink pressure is raised and ink is ejected from the ejection nozzles 8.

Next, a method for manufacturing the inkjet head will be described below. First, eight metallic plates among the metallic plates 22 to 30 except the nozzle plate 30 are bonded to each other by means of the diffusion bonding.

Figure 8:
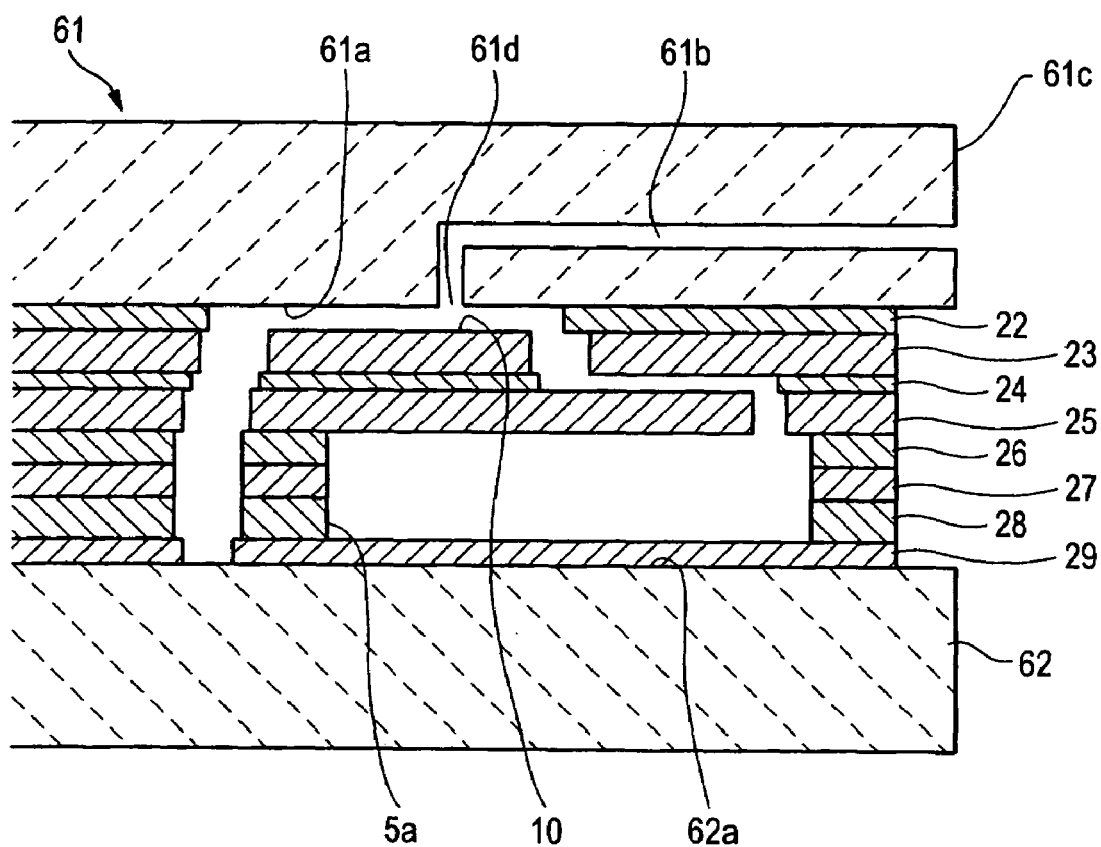
FIG. 8 is a section view showing a method of bonding a flow-path unit shown in FIG. 6.

In order to bond the metallic plates 22 to 29 by means of the diffusion bonding, as shown in FIG. 8, the metallic plates 22 to 29 are positioned and laminated on each other. Then, a first jig 61 and a second jig 62 (described later) are made to abut against the cavity plate 22 and the cover plate 29, respectively. That is, a laminated body of the metallic plates 22 to 29 is sandwiched between the first jig 61 and the second jig 62 (a first step).

Next, the laminated body of the metallic plates 22 to 29, which is sandwiched between the first jig 61 and the second jig 62, is put into a furnace. After the air has been discharged from the furnace by a vacuum pump so that the pressure in the furnace is reduced to a value equal to or lower than the atmospheric pressure. Then, while being heated at about 1000° C., pressure is applied to the laminated body of the metallic plates 22 to 29 in the lamination direction with the first jig 61 and the second jig 62 (the second step). Thereby, metallic atoms are diffused to each other in bonding surfaces of the metallic plates 22 to 29, so that the metallic plates 22 to 29 are bonded to each other. In order to more surely bond the metallic plates 22 to 29 to each other, the air may be discharged from the furnace by a vacuum pump until the furnace is evacuated.

Explanations will be made on the first jig 61 and the second jig 62 for sandwiching the metallic plates 22 to 29 therebetween. The first jig 61 and the second jig 62 have rectangular plate-shaped bodies made of ceramics. The first jig 61 and the second jig 62 have flat abutment surfaces 61a, 62b for abutting against the cavity plate 22 and the cover plate 29, on one surfaces of the plate-shaped bodies, respectively.

The first jig 61 further includes an atmosphere communication path 61b. The atmosphere communication path 61b vertically extends from opening portion 61d, which is formed by opening a portion of the abutment surface 61a of the first-jig 61, to the inside of the first jig 61. At the middle portion, the atmosphere communication path 61b is bent in a direction parallel with the abutment surface 61a and open at a side surface 61c of the first jig 61. In this embodiment, the opening portion 61d may serve as a communication portion. The atmosphere communication path 61b may be open in any region except a region where the first jig 61 abuts against the cavity plate 22. For example, the atmosphere communication path 61b may be open on a surface on the opposite side to the abutment surface 61a of the first jig 61. Alternatively, the atmosphere communication path 61b may be open in a portion of the abutment surface 61a with which the cavity plate 22 abuts.

In the first step, as shown in FIG. 8, the abutment surface 61a of the first jig 61 is brought to abut against the cavity plate 22 and the abutment surface 62a of the second jig 62 is brought to abut against the cover plate 29 while the laminated body, the first jig 61 and the second jig 62 are positioned so that one of the pressure chambers 10 of the cavity plate 22 and the opening portion 61d of the first jig 61 communicate with each other.

The first jig 61 may be provided with the opening portions 61d so that one of the opening portions 61d corresponds to one of the pressure chambers 10 communicating with one of the manifolds 5. In other words, number of the opening portions 61d provided in the first jig 61 may be equal to that of the manifolds 5.

Accordingly, the ink flow path 32 communicates with the atmosphere via the atmosphere communication path 61b. Thus, when the furnace is made into a vacuum state, the ink flow path 32 can be surely made into a vacuum state. Therefore, it is possible to prevent the following problems from occurring. One probable problem is that when the air in the ink flow path 32 is expanded in the stage of heating the laminated body, the inner pressure in the ink flow path 32 is raised and failure of bonding the metallic plates may be caused. As a result, leakage is caused in the flow path. Further, another probable problem is that the temperature distribution of the metallic plates 22 to 29 becomes non-uniform and distortion may be generated in the flow-path unit 4.

When the cavity plate 22 and the abutment surface 61a of the first jig 61 are made to abut against each other, since the pressure chamber 10 has a relatively large area, the pressure chamber 10 and the opening portion 61d of the first jig 61 can be easily positioned to each other.

Portions of the atmosphere communication path 61b except the opening portion 61d are provided inside the first jig 61. Therefore, when pressure is applied to the metallic plates 22 to 29 with the jigs 61, 62, the pressure is applied to the entire metallic plates 22 to 29. Accordingly, the metallic plates 22 to 29 can be bonded to each other in a good condition. Further, since the atmosphere communication path 61b is provided in the first jig 61, it is unnecessary to perform a step in which atmosphere communication paths are formed in portions of the metallic plates 22 to 29. Accordingly, the manufacturing process can be simplified.

Since the first jig 61 and the second jig 62 are plate-shaped bodies, a plurality of structures—in each of which a pair of jigs sandwich the metallic-plate lamination body therebetween—may be laminated on each other. While being heated, the pressure is applied to the plurality of structures from both sides thereof in the lamination direction. Thereby, the plurality of lamination bodies can be simultaneously manufactured. In this case, the atmosphere communication path 61b may be open on the side surface of the first jig 61 rather than the surface opposite to the abutment surface 61a of the first jig 61.

After the metallic plates 22 to 29 have been bonded to each other, the nozzle plate 30 is adhered to a lower face of the cover plate 29 with adhesive. Further, an adhesive layer g is formed by means of transfer on an upper surface of partition wall portions for partitioning the respective pressure chambers 10, which are formed in the cavity plate 22, from each other as shown in FIG. 7. After that, a ceramic heater is pushed onto the actuator units 21 so that the actuator units 21 are heated while the pressure is being applied thereto. In this way, the actuator units 21 are adhered to the flow-path unit 4. At this time, the individual electrodes 35 on the actuator unit 21 and the corresponding pressure chambers 10 are positioned so as to be opposed to each other.

Next, modified embodiments in which various modifications are made in the above-described embodiment will be described below. In the following description, the same reference numerals are used to indicate the same parts of the above-described embodiment and the description thereon will be omitted appropriately.

Figure 9:
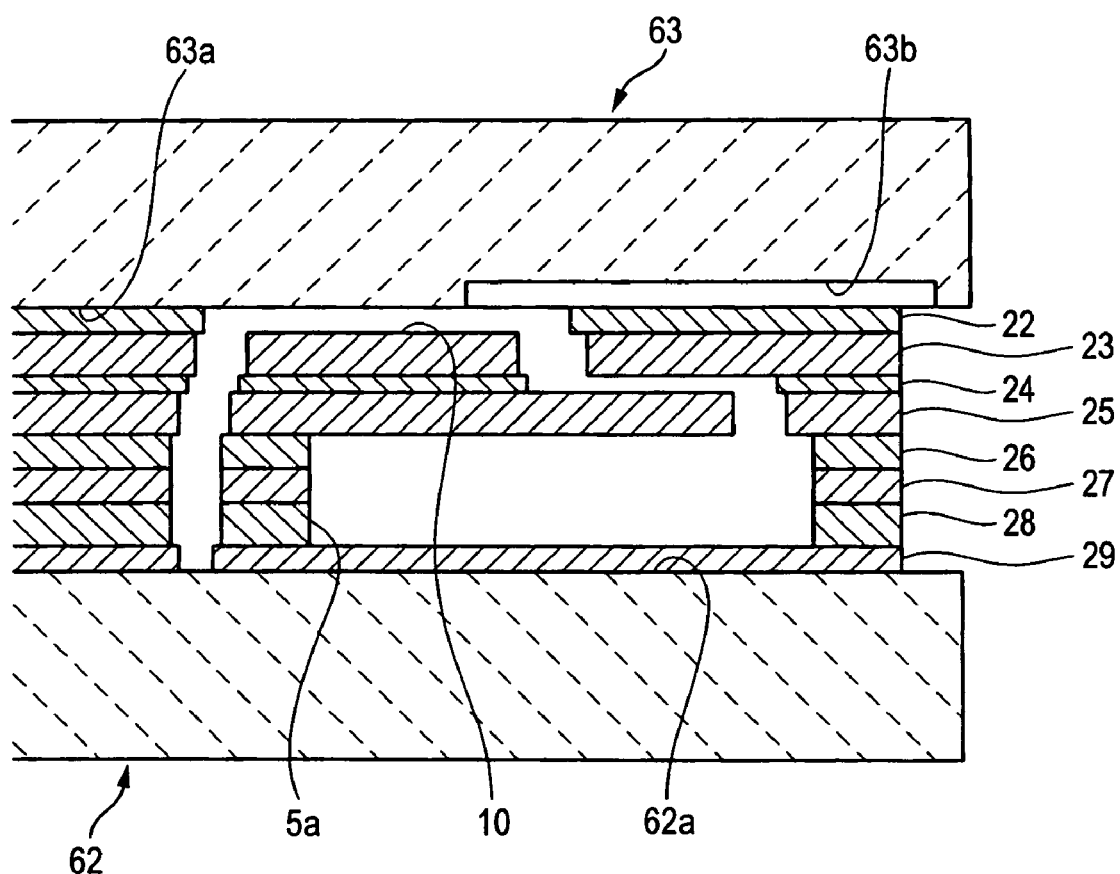
FIG. 9 is a section view of a modified embodiment 1 and corresponds to FIG. 8.

1] As shown in FIG. 9, a modified embodiment 1 may be configured as follows. A portion of an abutment surface 63a of the first jig 63 may be open and an escape groove 63b may be formed to extend from a region facing one pressure chamber 10 to a portion where the abutment surface 63a does not abut against the metallic plates 22 to 29. In this case, since the ink flow path 32 communicates with the atmosphere via the escape groove 63b, the ink flow path 32 can be brought into a vacuum state by a vacuum pump before conducting the diffusion bonding. Therefore, it is possible to prevent the following problems from occurring. One probable problem is that when the air in the ink flow path 32 is expanded when heated, the inner pressure in the ink flow path 32 is raised and failure of bonding the metallic plates may be caused. Further, another probable problem is that the temperature distribution of the metallic plates 22 to 29 becomes non-uniform and distortion may be generated in the flow-path unit 4. Also, in this modified embodiment, since the escape groove 63b is formed in the abutment surface 63a, the escape groove 63b can be easily formed.

Figure 10:
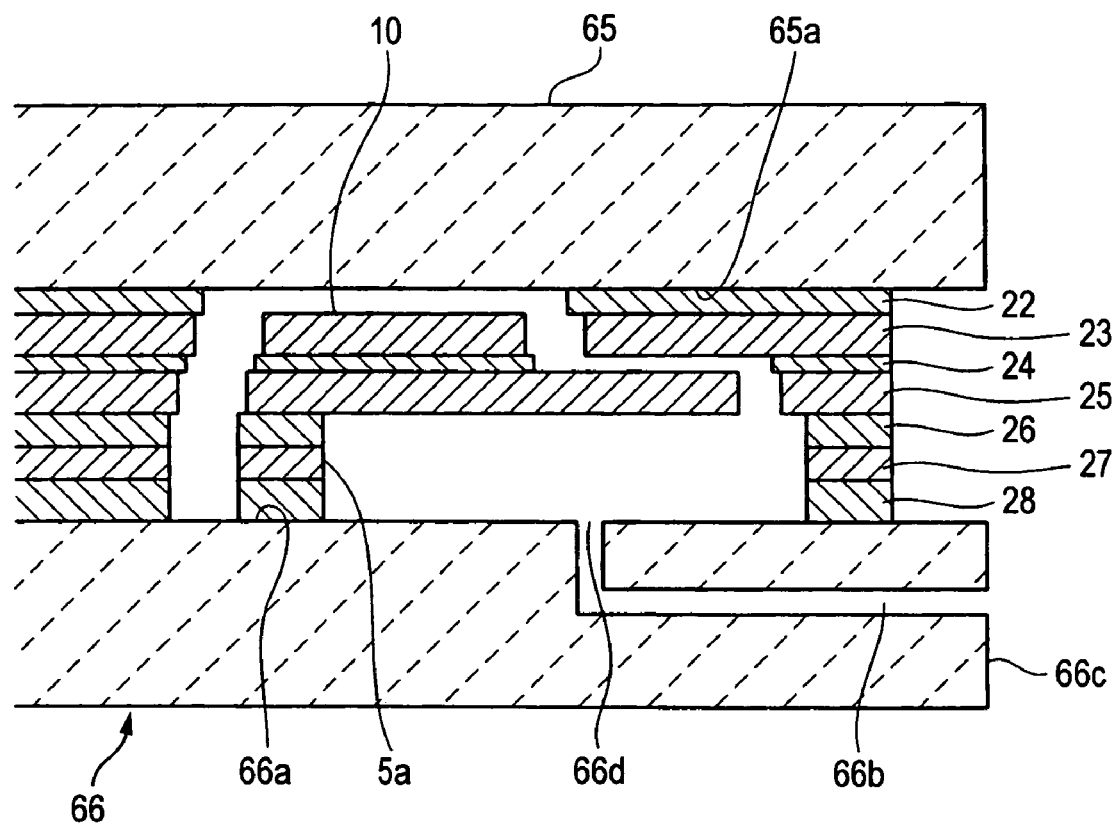
FIG. 10 is a section view of a modified embodiment 2 and corresponds to FIG. 8.

2] A modified embodiment 2 is configured as follows. In the case where the cover plate 29 is omitted or bonded in a different step later, the manifold plate 28 abuts against the second jig 66. In this case, as shown in FIG. 10, an atmosphere communication path 66b may be provided in the second jig 66. The atmosphere communication path 66a is formed in the following manner. An opening portion 66d is formed by opening a portion of the abutment surface 66a. The opening portion 66d extends vertically inside the second jig 66, is bent in the middle portion in a direction parallel with the abutment surface 66a, and is open at a side surface 66c of the second jig 66. In this case, the metallic plates 22 to 28 are bonded to each other by means of the diffusion bonding as follows. The cavity plate 22 and the abutment surface 65a of the first jig 65 are made to abut against each other. While the manifold plate 28 and the second jig 66 are positioned so that the sub-manifold 5a (serving as a common ink chamber) and the opening portion 66d communicate with each other, the manifold plate 28 is brought to abut against the abutment surface 66a of the second jig 66. Thereby, the first jig 65 and the second jig 66 sandwich the seven laminated metallic plates 22 to 27 therebetween. Then, the metallic plates 22 to 27 are heated and pushed to each other so that the diffusion bonding is conducted. At this time, since the sub-manifold 5a communicates with the atmosphere via the atmosphere communication path 66b, it is possible to bring the ink flow path 32 into a vacuum state before conducting the diffusion bonding. Since the area of the sub-manifold 5a is larger than that of the pressure chamber 10 as shown in FIGS. 3 and 4, when the abutment surface 66a of the second jig 66 and the manifold plate 28 are brought to abut against each other, the sub-manifold 5a and the opening portion 66d of the second jig 66 can be more easily positioned to communicate with each other. In this case, after the metallic plates 22 to 28 have been bonded to each other by means of the diffusion bonding, the cover plate 29 and the nozzle plate 30 are bonded to each other. In the modified embodiment 2, the atmosphere communication path 66*b* is open at the side surface 66*c* of the second jig 66. However, the atmosphere communication path 66*b* may be open in any region of the second jig 66 as long as the region does not abut against the manifold plate 28. For example, the atmosphere communication path 66*b* may be open in a surface opposite to the abutment surface 66*a* of the second jig 66. Alternatively, the atmosphere communication path 66*b* may be open in a portion of the abutment surface 66*a* where the abutment surface 66*a* does not abut against the manifold plate 28.

In the case where only portions of the metallic plates 22 to 29 are bonded to each other, the invention can be applied to. Further, applying the method of bonding the metallic plates of the invention and the jig for bonding the metallic plates are not limited to the inkjet head.

While a number of exemplary aspect and embodiments have been discussed above, those of skill in the art will recognize certain modifications, permutations, additions and sub-combinations thereof. It is therefore intended that the following appended claims and claims hereinafter introduced are interpreted to include all such modifications, permutations, additions and sub-combinations as are within the true spirit and scope.

What is claimed is:

1. A method for bonding metallic plates, comprising:
   sandwiching a laminated body, which comprises a plurality of metallic plates and is formed with an inner cavity opening on a surface thereof, between a pair of jigs each comprising a flat abutment surface abutting against respective surfaces of the laminated body, wherein at least one of the jigs is formed with an atmosphere communication path, the atmosphere communication path communicates with the inner cavity and atmosphere and comprises an escape groove extending along the flat abutment surface of the at least one of the jigs, the escape groove extends from a communication portion where the escape groove communicates with the inner cavity to a portion where the flat abutment surface does not abut against the laminated body to allow the escape groove to communicate with the atmosphere; and
   heating the laminated body while applying pressure to the laminated body with the pair of jigs in a lamination direction of the laminated body.

2. The method according to claim 1, wherein: the atmosphere communication path extends into an inside of the at least one of the jigs from a communication portion formed in the flat abutment surface of the at least one of the jigs where the atmosphere communication path communicates with the inner cavity, and the atmosphere communication path opens in a portion of the at least one of the jigs where the at least one of the jigs does not abut against the laminated body.

3. The method of bonding metallic plates according to claim 1, wherein the inner cavity includes an ink flow path of an inkjet head through which ink to be ejected from a nozzle flows.

4. The method of bonding metallic plates according to claim 2, wherein the inner cavity includes an ink flow path of an inkjet head through which ink to be ejected from a nozzle flows.

5. The method according to claim 3, wherein: the inner cavity includes a plurality of ink flow paths, the ink flow paths include a plurality of pressure chambers communicating with a plurality of nozzles, respectively, the ink flow paths open at the plurality of pressure chambers, and in the sandwiching, the laminated body is sandwiched between the pair of jigs with the atmosphere communication path of the at least one of the jigs communicating with at least one of the pressure chambers.

6. The method according to claim 4, wherein: the inner cavity includes a plurality of ink flow paths, the ink flow paths include a plurality of pressure chambers communicating with the plurality of nozzles, respectively, the ink flow paths open at a plurality of pressure chambers, and in the sandwiching, the laminated body is sandwiched between the pair of jigs with the atmosphere communication path of the at least one of the jigs communicating with at least one of the pressure chambers.

7. The method according to claim 3, wherein: the inner cavity includes a plurality of ink flow paths, the inner cavity includes a common ink chamber communicating with a plurality of nozzles through the respective ink flow paths, the inner cavity opens at the common ink chamber, and in the sandwiching the laminated body is sandwiched between the pair of jigs with the atmosphere communication path of the at least one of the jigs communicating with the common ink chamber.

8. The method according to claim 4, wherein: the inner cavity includes a plurality of ink flow paths, the inner cavity includes a common ink chamber communicating with a plurality of nozzles through the respective ink flow paths, the inner cavity opens at the common ink chamber, and in the sandwiching the laminated body is sandwiched between the pair of jigs with the atmosphere communication path of the at least one of the jigs communicating with the common ink chamber.

9. A method for bonding metallic plates, comprising:
   sandwiching a laminated body, which comprises a plurality of metallic plates and is formed with an inner cavity opening on a surface thereof, between a pair of jigs each comprising a flat abutment surface abutting against respective surfaces of the laminated body, wherein at least one of the jigs is formed with an atmosphere communication path, the atmosphere communication path communicates with the inner cavity and atmosphere and comprises an escape groove extending along and immediately adjacent to the flat abutment surface of the at least one of the jigs, the escape groove extends from a communication portion where the escape groove communicates with the inner cavity to a portion where the flat abutment surface does not abut against the laminated body; and
   heating the laminated body while applying pressure to the laminated body with the pair of jigs in a lamination direction of the laminated body.

* * * * *